(12) United States Patent
Chen et al.

(10) Patent No.: US 9,120,930 B2
(45) Date of Patent: Sep. 1, 2015

(54) HEAT DISSIPATING PAINT WITH HIGH THERMAL RADIATING CAPABILITY

(71) Applicants: Sihai Chen, New Hartford, NY (US); Ning-Cheng Lee, New Hartford, NY (US)

(72) Inventors: Sihai Chen, New Hartford, NY (US); Ning-Cheng Lee, New Hartford, NY (US)

(73) Assignee: Indium Corporation, Clinton, NY (US)

( * ) Notice: Subject to any disclaimer, the term of this patent is extended or adjusted under 35 U.S.C. 154(b) by 191 days.

(21) Appl. No.: 13/655,276

(22) Filed: Oct. 18, 2012

(65) Prior Publication Data

US 2013/0112109 A1   May 9, 2013

Related U.S. Application Data

(60) Provisional application No. 61/549,114, filed on Oct. 19, 2011.

(51) Int. Cl.
  *C09D 5/00* (2006.01)
  *C09D 7/12* (2006.01)

(52) U.S. Cl.
  CPC .............. *C09D 5/00* (2013.01); *C09D 7/1216* (2013.01)

(58) Field of Classification Search
  None
  See application file for complete search history.

(56) References Cited

U.S. PATENT DOCUMENTS

| 6,358,307 | B1 | 3/2002 | Legrand et al. | |
| 8,172,938 | B2 * | 5/2012 | Alright et al. | 106/672 |
| 2010/0136256 | A1 * | 6/2010 | Hwang et al. | 427/540 |
| 2011/0086206 | A1 | 4/2011 | Scheffer et al. | |
| 2011/0155019 | A1 * | 6/2011 | Albright et al. | 106/675 |
| 2011/0217565 | A1 | 9/2011 | Tada et al. | |

FOREIGN PATENT DOCUMENTS

| CN | 101942266 | | 1/2011 |
| EP | 1335004 | | 9/2008 |
| JP | WO2008056214 | * | 5/2008 |
| WO | 2008056214 | | 5/2008 |

OTHER PUBLICATIONS

International Search Report and the Written Opinion for International App No. PCT/US2012/060999, mailed Jan. 22, 2013, Authorized Officer: Rbia-Brand, Irene.
State of Intellectual Property Office of PRC, First Office Action, App No. 201280051406.1, Issued Dec. 2, 2014.

* cited by examiner

*Primary Examiner* — Patricia L Hailey
*Assistant Examiner* — Colette Nguyen
(74) *Attorney, Agent, or Firm* — Sheppard Mullin Richter & Hampton LLP

(57) ABSTRACT

A high emissive paint comprises organic materials with different functional groups, one or more inorganic materials, and optionally other paint property adjusting agents. The infrared absorption range of the paint derives from organic functional groups, such as C—C, C—H, N—H, C—N, C—O and C—X groups, and the one or more inorganic materials. One or more inorganic materials may also be present as micro- or nano-sized particles.

17 Claims, 3 Drawing Sheets

A	B

HEAT DISSIPATING PAINT WITH HIGH THERMAL RADIATING CAPABILITY

RELATED PATENT APPLICATIONS

This application claims the benefit of U.S. Prov. App. No. 61/549,114, filed Oct. 19, 2011 which is incorporated herein by reference in its entirety and for all purposes.

FIELD OF THE INVENTION

The present invention relates to heat dissipating paints. More specifically, the invention relates to paints with high thermal emissivity which can be directly applied on a substrate surface for rapid heat removal.

BACKGROUND OF THE INVENTION

With the demand for increasing the power and efficiency of electronic devices, heat density on the devices increase rapidly, resulting in the increased possibility of damaging the devices. Therefore, heat removal from the functional devices has become critical in industry.

For example, in the solar industry, the operational temperature of photovoltaic (PV) modules is the key factor in determining the transfer efficiency of the devices. For every 1° C. above 25° C., the electrical output drops by about 0.4% to 0.5%. A typical rooftop PV array may operate at about 55° C. to 75° C., which means electrical output may be about 12% to 25% below the nameplate rating.

In another example, light emitting diodes (LEDs) have drawn increased interest as a potential replacement for the conventional light bulb. However, like PV modules, LED performance suffers with increased operational temperature. For instance, high junction temperatures can cause losses in efficacy, shortened LED life-time and color degradation. This can be problematic as typically about 75% to 85% of the energy used to drive a LED is converted to heat. Under constant operation at routine ambient conditions, the junction temperature in a LED may be 60° C. or greater, which means that the LED's light output can be 10% to 50% below the device's rating.

Three common mechanisms (conduction, convection and radiation) are useful for removing heat from devices. In the case of conduction, energy is carried by the atomic lattice through electrons or through phonon-phonon interactions in solids. Thermal paste and thermal pads operate based on this mechanism. In the case of convection, generally a hot device is contacted with a flow of cold liquid or gas. Heat transfers from the hot device to the cold liquid or gas, which is carried away and replaced with more cold liquid or gas. These systems often require a dedicated system to control the flow of the cooling liquid or gas, and potentially require additional components such as heat sinks or fans. Use of such systems is clumsy and expensive. Further, when the area of the high temperature surface is large, it is practically impossible to use convection for effective cooling. Finally, in the case of thermal radiation, heat is dissipated through electromagnetic wave or photon irradiation without the need of a medium to transfer heat away from the surface. Thermal radiation mechanisms are typically used for high-temperature application, e.g., at 750° C. or above. For example, high emissivity coatings have been reported for use as furnace internal coatings.

SUMMARY OF THE INVENTION

In a first aspect, thermally emissive paints are presented. In some embodiments, thermally emissive paints of the present invention comprise a plurality of organic materials comprising a halogenated hydrocarbon or having a functional group selected from the group consisting of an amine, an alkyl, a hydroxyl, an epoxide, a carboxylic acid, and a vinyl; and an inorganic material that thermally absorbs within the range of about 1 to 40 μm.

In some embodiments, the plurality of organic materials and the at least one inorganic material are selected such that the thermally emissive paint absorbs across substantially all of the range of about 2 to 15 μm. In some embodiments, the plurality of organic materials and the at least one inorganic material are selected such that the thermally emissive paint absorbs across substantially all of the range of about 2 to 40 μm. In some embodiments, the plurality of organic materials and the at least one inorganic material are selected such that the thermally emissive paint absorbs across a majority of the range of about 1 to 50 μm.

In some embodiments, the plurality of organic materials comprises one or more of the group consisting of butadiene-styrene, acrylated epoxylated soybean oil, and proline.

In some embodiments, the inorganic material comprises a microparticulate or nanoparticulate inorganic material.

In some embodiments, the inorganic material comprises one or more of the group consisting of carbon black, graphite, charcoal powder, and activated carbon.

In some embodiments, the inorganic material comprises one or more of the group consisting of a metal oxide, a metal sulfide, a metal nitride, and a metal phosphide. In some embodiments, the inorganic material comprises one or more of the group consisting of glazed tile and rusted iron. In some embodiments, the inorganic material comprises one or more of the group consisting of vanadium oxide, quartz, alumina, and antimony oxide.

In some embodiments, the organic materials comprise butadiene-styrene, an acrylated epoxylated soybean oil, and proline. In some related embodiments, the thermally emissive paint is 20% by weight butadiene-styrene, 30% by weight acrylated epoxylated soybean oil, and 10% by weight proline. In some related embodiments, the inorganic material comprises vanadium oxide and activated carbon. In some further related embodiments, the paint is 20% by weight butadiene-styrene, 30% by weight acrylated epoxylated soybean oil, 10% by weight proline, 30% by weight vanadium oxide, and 10% by weight activated carbon.

In some embodiments, the paint has an emissivity of greater than or equal to about 90%, such as greater than or equal to about 92%, greater than or equal to about 95%, greater than or equal to about 97%, or even about 100%.

In some other embodiments, thermally emissive paints of the present invention comprise a plurality of organic functional groups, such that plurality of organic functional groups thermally absorbs across substantially all of the range of about 2 to 15 μm; and an inorganic material that thermally absorbs within the range of about 1 to 40 μm.

In some related embodiments, the plurality of organic functional groups and inorganic material thermally absorbs across substantially all of the range of about 2 to 40 μm. In some related embodiments, the plurality of organic functional groups and inorganic material thermally absorbs across the majority of the range of about 1 to 50 μm.

In some embodiments, the plurality of organic function groups comprises three or more of the group consisting of an amine, an alkyl, a hydroxyl, an epoxide, a carboxylic acid, and a vinyl.

In some embodiments, the inorganic material comprises one or more of the group consisting of a metal oxide, a metal sulfide, a metal nitride, and a metal phosphide.

As used herein, the term "about" in quantitative terms refers to plus or minus 10%. For example, "about 3%" would encompass 2.7-3.3% and "about 10%" would encompass 9-11%. Moreover, where "about" is used herein in conjunction with a quantitative term it is understood that in addition to the value plus or minus 10%, the exact value of the quantitative term is also contemplated and described. For example, the term "about 3%" expressly contemplates, describes and includes exactly 3%.

DETAILED DESCRIPTION

Various embodiments of the invention provide a thermal paint that when coated on a surface, facilitates heat removal from the surface without the use of any further accessory device such as heat sink or fan. In principle, the thermal paint utilizes the mechanism of thermal radiation, in which heat is dissipated through electromagnetic wave or photon irradiation without the need of a medium to transfer heat away from the surface.

The thermally emissive paints of the present invention can be easily used not only for dedicated small surface areas, but also for large surface area applications such as used in the solar panel backside heat dissipation and LED backside heat dissipation.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

In thermodynamics, a body at temperature, T, radiates electromagnetic energy. A perfect black body in thermodynamic equilibrium absorbs all radiant energy that strikes it, and radiates energy according to a unique law of radiative emissive power for temperature, T, universal for all perfect black bodies. Kirchhoff's law of thermal radiation is a mathematical description of this behavior. One corollary of Kirchhoff's law is that for an arbitrary body emitting and absorbing thermal radiation in thermodynamic equilibrium, the emissivity (the dimensionless ratio of how close a body is to a perfect black body) is equal to the absorptivity of the body. Thus, for materials to have high emissivity, they must also have high absorptivity.

Thermal absorptivity in a paint may be affected by the material composition. For instance, the high-temperature high emissivity paint of the prior art (mentioned above), comprises inorganic materials which absorb in the infrared region of the spectrum. These inorganic materials are used because the intended operational temperatures so high that only inorganic materials survive during operation. The paints of the present invention differ in that their intended operational temperatures are much lower (e.g., less than about 250° C.), allowing the use of selected organic materials to enhance thermal absorption. Thus, paints of the present invention comprise selected organic materials that exhibit absorption in the infrared region of the electromagnetic spectrum.

Figure 1:
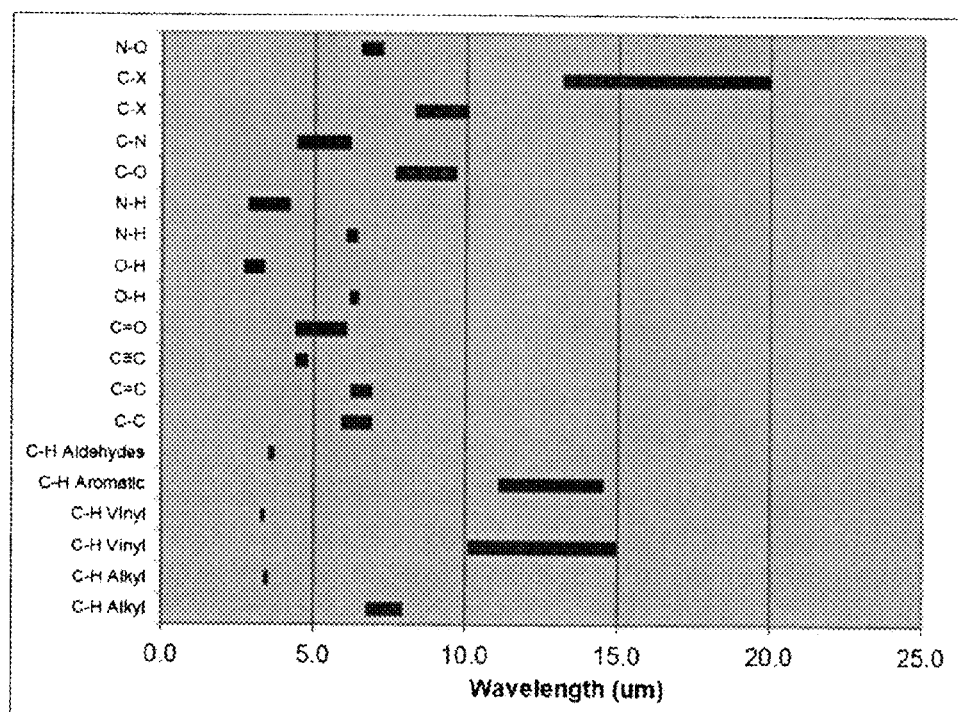
FIG. 1 shows the approximate wavelength ranges for infrared absorption of various organic functional groups.

As shown in FIG. 1, different organic functional groups absorb at different wavelength ranges within the infrared spectrum. To enhance thermal absorptivity, it is desirable for the paint to comprise materials that have absorption wavelength ranges that cover most, if not all, of the infrared spectrum. Thus, in some embodiments, a paint of the present invention comprises one or more organic species such that multiple functional groups are present in the paint. In these embodiments, the one or more organic species are selected so that the functional groups present in the paint have different infrared absorption wavelength ranges, thus providing a paint that absorbs across a variety of wavelengths in the infrared range.

For example, some embodiments include organic amine groups (N—H, absorption=about 2.9-4.2 μm; C—N, absorption=about 4.4-6.1 μm), such as amines with structures:

These amine groups may include primary amines two of R, R' and R" are hydrogen), such as methylamine, ethanolamine (2-aminoethanol), or an aromatic amine such as aniline.

Alternatively or in addition, these amine groups may include secondary amines (i.e., one of R, R' and R" is hydrogen), such as dimethylamine, methylethanolamine, or an aromatic such as diphenylamine.

Alternatively or in addition, these amine groups may include tertiary amines (i.e., all three of R, R' and R" are all alkyl, aryl or both). Exemplary tertiary amines include trimethylamine, triethylamine or triphenylamine. Other exemplary tertiary amines may be cyclic amines, and can be alkyl, aryl or both. As alkyl hydrocarbon groups (C—C, absorption=about 6.0-6.9 μm; C—H, absorption=about 6.8-7.9 μm) absorb in a different region of the infrared spectrum, they may also be included in the paint separately or as a component in the R, R' and R" alkyl or aryl groups in the organic amines.

Other sources of organic amines which may be used in some embodiments include polyamine monomers, for example ethylenediamine, diethylenetriamine, triethylenetetramine (TETA). These amine compounds can be used as hardener if epoxies are also used in a component in the paint. When epoxies and polyamine monomers are mixed, the amine groups in the polyamine monomers react with the epoxide groups to form covalent bonds. Each N—H group can react with an epoxide group from a different pre-polymer molecule, so that the final paint texture can be controlled by the extent of crosslinking.

As indicated above, some embodiments include alkyl or aryl groups. Preferred alkyl or aryl groups contain 1 to 24 carbons, such as 1 to 18 carbons, and can be saturated aliphatic or unsaturated. In certain embodiments, the unsaturated alkyl or aryl group may be a vinyl hydrocarbon (C—H, absorption=about 10.1-14.9 μm), such as an acrylic compound or styrene and its derivatives. Vinyl hydrocarbons have the additional benefit of being useful for adjusting paint texture finishes.

Some embodiments may alternatively or in addition contain one or more oxygen containing organic functional groups (C—O, absorption=about 7.7-9.6 μm; and C=O, about 4.4-6.1 μm), such as alcohols (hydroxyl groups), carboxylic acids, aldehydes, esters, ethers, and epoxides (including an epoxide ethers, e.g., as found in epoxies). These oxygen containing organic functional groups may be found in an epoxy resin, such as those produced from a reaction between epichlorohydrin and bisphenol-A, though the latter may be replaced by similar chemicals, such as bisphenol-F, etc.

Some embodiments may alternatively or in addition contain a halogenated hydrocarbon (C—X (X=F, Cl, Br, I, or At), 13.2-20 μm). Halogenated hydrocarbons are particularly beneficial due to their wide range of infrared absorption (i.e., about 2.9-20 μm). In addition, due to the high bonding energy between carbon and halogen atoms, certain chemicals comprising these functional groups also contribute desirable properties to a paint, such as UV and/or moisture resistance, good mechanical strength, and potentially resistant to weathering. Exemplary halogenated hydrocarbons include halogenated polymers such as polyvinyl chloride (PVC) and polytetrafluoroethene (PTFE, or Teflon).

Figure 2:
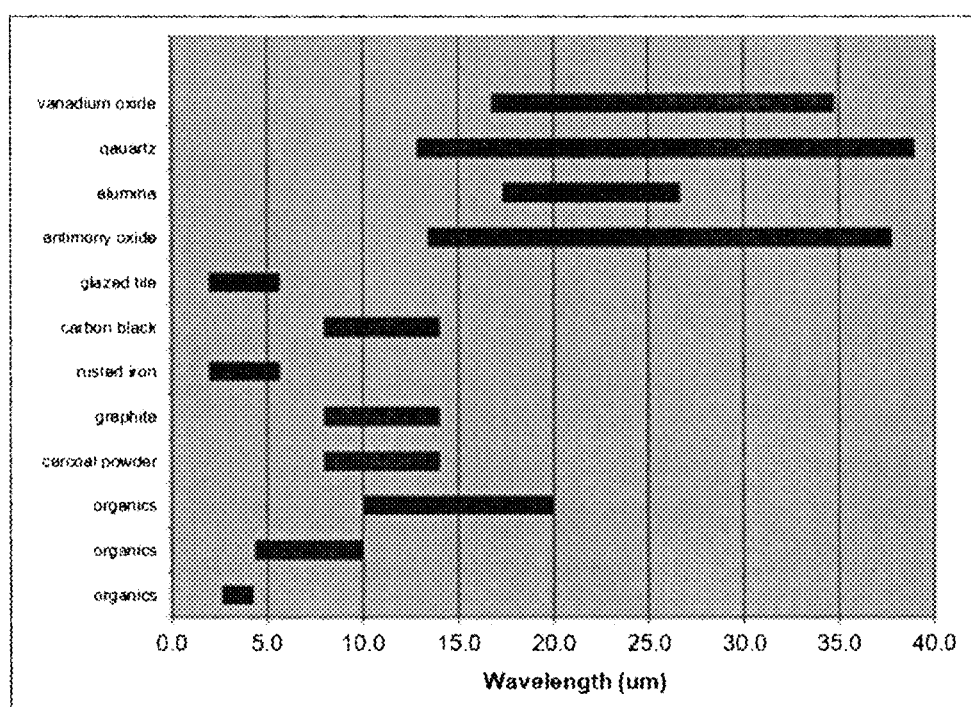
FIG. 2 shows the approximate wavelength ranges for infrared absorption of various inorganic materials.

While organic compounds may be used to enhance absorption in most of the infrared range, other portions of the range (e.g., at wavelengths less than about 2.9 μm, or greater than about 20 μm) may benefit from inclusion of other, inorganic, components. Additionally, in the range covered by organics, some absorption peaks may be weaker than is desired, or may be strong but may only cover a more narrow range than is desired. Thus, in some embodiments, inorganic materials are added to the paint to supplement absorption outside the absorption range of organic species present in the paint, and/or increase the absorption intensity in some wavelength range covered by the organic species present in the paint. FIG. 2 lists some exemplary inorganic materials and shows that different inorganic materials absorb at different wavelength ranges within the infrared spectrum. Any of the exemplary materials shown in FIG. 2, and others not listed, can be included singly or in combination in the paint as desired.

Additionally, some embodiments may lack halogenated hydrocarbons, as in some instances their presence may raise environmental concerns. In these embodiments, one or more inorganic compounds that cumulatively exhibit infrared absorption within the range of the range of 13.2 to 20 μm may be included in the paint. As shown in FIG. 2, several inorganic combinations such as charcoal with quartz or antimony oxide powders cover the majority of, or even extend beyond, the infrared absorption range that may otherwise be exhibited by halogenated hydrocarbons.

Embodiments utilizing inorganic materials may include a single inorganic material, or combinations of a variety of materials, such as two, three, four, five, or more. For instance, to extend the infrared absorption range or augment absorption within the range covered by the organic functional groups, glazed tile and rusted iron may be used to extend or augment infrared absorption in the range from about 2 to 5.6 μm (as seen in FIG. 2). Glazed tiles typically comprise five oxides including $SiO_2$, $Al_2O_3$, $B_2O_3$, CaO, and $Na_2O$, with quartz as the major crystalline phase. Rusted iron predominantly comprises iron oxides; including hydrated iron (III) oxides $Fe_2O_3 \cdot nH_2O$ and iron (III) oxide-hydroxide $FeO(OH) \cdot Fe(OH)_3$.

In other embodiments, select inorganic materials may be used to augment adsorption in the range from about 8 to 14 μm. For instance, carbon black, graphite, activated carbon, and charcoal powders may be used to enhance absorption in the range that organics already cover.

In other embodiments, select inorganic materials may be used to extend infrared absorption at wavelengths of greater than about 20 μm, such as between about 20 and 50 μm, such as between about 20 and 39 μm. For instance, select materials, such as vanadium oxide, quartz (i.e., silicon dioxide), alumina (i.e., aluminum oxide), and antimony oxide exhibit infrared absorption in the range from about 13 to 39 μm. Other inorganic materials, such as metal oxides (e.g., CuO, $MnO_2$, $Co_2O_3$, $Fe_2O_3$, $Cr_2O_3$, NiO, ZnO, $TiO_2$, $Bi_2O_3$, etc.), metal sulfides, metal nitrides, metal phosphides, etc. may also be used according to their respective infrared absorption ranges.

Thus, some embodiments may include one or more inorganic materials, in addition to organic species as described above. In particular, in some embodiments the inorganic materials are selected from the group consisting of vanadium oxide, quartz (i.e., silicon dioxide), alumina (i.e., aluminum oxide), and antimony oxide. In some embodiments, the inorganic materials are selected from the group consisting of metallic oxides, sulfides, nitrides, and phosphides.

Figure 3:
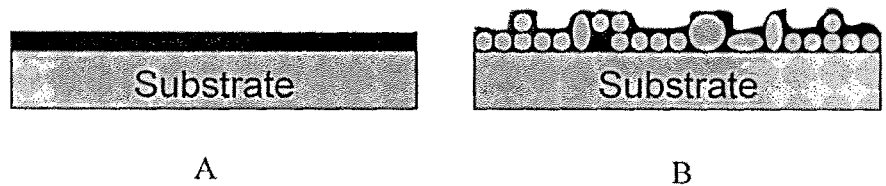
FIG. 3 illustrates the increase in surface area of a paint due to inclusion of particulate inorganic materials. The paint coating Surface A does not include particulate matter; the paint coating Surface B does.

In some embodiments, the inorganic materials are added as microparticles or nanoparticles, or both. Doing serves the additional purpose of increasing the surface area of the paint. This effect is illustrated in FIG. 3. A large surface area of the paint is preferred, as the surface area is directly proportional to the radiation intensity of the paints. In these embodiments, the size of the inorganic particles can range from 5 nm to 500 micrometers.

In some embodiments, various combinations of the above are used to provide a paint with emissivity of ≥90%, such as ≥92%, ≥95%, ≥97%, or even about 100%, to dissipate a large amount of heat through radiation. Accordingly, in these embodiments, the paint comprises one or more organic species with functional groups that exhibit infrared absorption within the range of about 1 to 50 μm. In some embodiments, the paint comprises one or more organic species with functional groups that exhibit infrared absorption within the range of about 2 to 30 μm, such as between about 2 to 20 μm, such as between about 2 to 15 μm. In some embodiments, the one or more organic species comprise two, three, four, five, or more different functional groups that absorb in the recited wavelength ranges. In some embodiments, the one or more organic species cumulatively exhibit infrared absorption substantially across the entire range of about 2 to 15 μm. In some embodiments, the one or more organic species cumulatively exhibit infrared absorption substantially across the entire range of about 2 to 20 μm. In some embodiments, the one or more organic species cumulatively exhibit infrared absorption substantially across the entire range of about 2 to 30 μm.

Additionally, the paints may utilize optional property adjusting agent. In some embodiments, the optional paint property adjusting agents include leveling agents, thixotropic agents, coloring agents, anti-cracking agents, anti-oxidizing agents, ultraviolet filtering agents, solvents and diluting agents. Such optional paint property adjusting agents are well known to those of skill in the art.

EXAMPLES

Example 1

One example paint of the present invention was prepared my mixing 20% by weight butadiene-styrene, 30% by weight acrylated epoxylated soybean oil, 10% by weight proline, 30% by weight vanadium oxide, and 10% by weight activated carbon. The constituents were mixed under stir for 8 h.

The butadiene-styrene, acrylated epoxylated soybean oil, and proline all contributed various organic functional groups that absorb in the infrared spectrum to the paint. For example, butadiene-styrene comprises alkyl, aromatic, and vinyl groups (e.g., C—C, C=C, and C—H (alkyl, aromatic, and vinyl)); acrylated eposylated soybean oil comprises oxygen-containing organic groups (e.g., C—O and C=O); and proline comprises organic amine groups (e.g., C—N and N—H). Thus, the paint comprises organic functional groups which absorb across substantially all of the range from about 2 to 15 μm.

Infrared absorption was further enhanced by inclusion of activated carbon and vanadium oxide, which exhibit absorption in the ranges of about 8 to 14 μm and 13 to 39 μm, respectively. Thus, the paint comprises organic functional groups and inorganic materials which absorb across substantially all of the range from about 2 to 40 μm.

The paint was applied to the surface of a copper coupon to test thermal emissivity. A comparison experiment was conducted by placing two copper coupons, one coated with the paint and one uncoated, at a similar spot on a hot plate. The two copper coupons were allowed to come to thermal equilibrium, and a thermocouple was used to check the respective surface temperatures. The experiment was repeated three times. The measured temperatures are shown in Table 1, and demonstrate that the paint decreased the surface temperature of the copper coupon by up to 14.7° C.

TABLE 1

Temperature (° C.) of unpainted and painted copper coupons

| Sample # | Surface Temperature (° C.) | | Temperature Difference |
|---|---|---|---|
| | Unpainted Copper | Painted Copper | |
| 1 | 79.8 | 65.1 | 14.7 |
| 2 | 76.5 | 66.4 | 10.1 |
| 3 | 73.8 | 60.1 | 13.7 |
| 4 | 74.8 | 65.2 | 9.6 |
| Mean | 76.2 | 64.2 | 12.0 |
| Standard Deviation | 2.63 | 2.80 | |

Example 2

Another exemplary paint was prepared by mixing 0.5 g of carbon black nanoparticles (40 nm), 0.075 g epoxy 509 (from Nanjing New Chemical Technology Co. Ltd.), 0.014 g N3390 curing agent (from Bayer), and 2.0 g tripropylene glycol n-butyl ether (TPnB) solvent. After thorough mixing, a copper coupon was coated, and heat treated at 180° C. to evaporate the solvent.

The coated sample was then compared with an uncoated reference copper coupon as described in Example 1. The measured temperatures are shown in Table 2, and demonstrate that the paint decreased the surface temperature by as much as 11.1° C.

TABLE 2

Temperature (° C.) of unpainted and painted copper coupons

| Sample # | Surface Temperature (° C.) | | Temperature Difference |
|---|---|---|---|
| | Unpainted Copper | Painted Copper | |
| 1 | 106.2 | 95.9 | 10.3 |
| 2 | 106.5 | 95.4 | 11.1 |
| 3 | 105.3 | 95.1 | 10.2 |

TABLE 2-continued

Temperature (° C.) of unpainted and painted copper coupons

| Sample # | Surface Temperature (° C.) | | Temperature Difference |
|---|---|---|---|
| | Unpainted Copper | Painted Copper | |
| 4 | 106.4 | 96.4 | 10 |
| Mean | 106.1 | 95.7 | 10.4 |
| Standard Deviation | 0.55 | 0.57 | |

That which is claimed is:

1. A thermally emissive paint, comprising:
   a plurality of organic materials comprising:
   proline; and
   at least one of butadiene styrene and acrylated epoxylated soybean oil; and one or more inorganic materials that thermally absorb within the range of about 1 to 40 μm;
   wherein the plurality of organic materials and the one or more inorganic materials absorb within the range of about 1 to 50 μm.

2. The thermally emissive paint of claim 1, wherein the plurality of organic materials and the one or more inorganic materials are selected such that the thermally emissive paint absorbs across the range of about 2 to 15 μm.

3. The thermally emissive paint of claim 1, wherein the plurality of organic materials and the one or more inorganic materials are selected such that the thermally emissive paint absorbs across the range of about 2 to 40 μm.

4. The thermally emissive paint of claim 1, wherein the one or more inorganic materials comprise a microparticulate or nanoparticulate inorganic material.

5. The thermally emissive paint of claim 1, wherein the one or more inorganic materials comprises one or more of the group consisting of carbon black, graphite, charcoal powders, and activated carbon.

6. The thermally emissive paint of claim 1, wherein the one or more inorganic materials comprise one or more of the group consisting of a metal oxide, a metal sulfide, a metal nitride, and a metal phosphide.

7. The thermally emissive paint of claim 1, wherein the one or more inorganic materials comprise one or more of the group consisting of glazed tile and rusted iron.

8. The thermally emissive paint of claim 1, wherein the one or more inorganic materials comprise one or more of the group consisting of vanadium oxide, quartz, alumina, and antimony oxide.

9. The thermally emissive paint of claim 1, wherein the plurality of organic materials comprise butadiene-styrene, acrylated epoxylated soybean oil, and proline.

10. The thermally emissive paint of claim 9, wherein the paint is 20% by weight butadiene-styrene, 30% by weight acrylated epoxylated soybean oil, and 10% by weight proline.

11. The thermally emissive paint of claim 9, wherein the one or more inorganic materials comprise vanadium oxide and activated carbon.

12. The thermally emissive paint of claim 11, wherein the paint is 20% by weight butadiene-styrene, 30% by weight acrylated epoxylated soybean oil, 10% by weight proline, 30% by weight vanadium oxide, and 10% by weight activated carbon.

13. The thermally emissive paint of claim 1, wherein the paint has an emissivity of greater than or equal to about 90%.

14. A thermally emissive paint, comprising:
a plurality of organic materials comprising butadiene-styrene, acrylated epoxylated soybean oil, and proline, wherein the plurality of organic materials thermally absorb across the range of about 2 to 15 µm; and
one or more inorganic materials that thermally absorb within the range of about 1 to 40 µm.

15. The thermally emissive paint of claim 14, wherein the plurality of organic materials and the one or more inorganic materials thermally absorb across the range of about 2 to 40 µm.

16. The thermally emissive paint of claim 14, wherein the plurality of organic materials and the one or more inorganic materials thermally absorb across the range of about 1 to 50 µm.

17. The thermally emissive paint of claim 14, wherein the one or more inorganic materials comprise one or more of the group consisting of a metal oxide, a metal sulfide, a metal nitride, and a metal phosphide.

* * * * *